United States Patent [19]
Davis et al.

[11] 3,897,263
[45] July 29, 1975

[54] APPARATUS FOR WASHING AND DISINFECTING TRAILER OR VAN INTERIORS

[76] Inventors: Oliver Thurston Davis; Norman R. Jones, both of Rt. 1, P.O. Box 22, Dunlap, Tenn. 37327

[22] Filed: Nov. 2, 1973

[21] Appl. No.: 412,467

[52] U.S. Cl. .................. 134/45; 134/52; 134/99; 239/187
[51] Int. Cl. ................. B60s 3/02; B08b 3/00
[58] Field of Search .......... 134/45, 123, 52, 56, 99, 134/50, 167, 171, 166, 168; 239/281, 165, 187

[56] References Cited
UNITED STATES PATENTS

| | | | |
|---|---|---|---|
| 3,351,289 | 11/1967 | Demaison | 239/187 |
| 3,534,746 | 10/1970 | Posner | 134/52 |
| 3,689,318 | 9/1972 | Phillips | 134/45 |
| 3,811,408 | 5/1974 | Thompson | 134/99 |

FOREIGN PATENTS OR APPLICATIONS

| | | | |
|---|---|---|---|
| 323,598 | 9/1957 | Switzerland | 134/52 |

Primary Examiner—Harvey C. Hornsby
Assistant Examiner—Robert T. Pous

[57] ABSTRACT

An apparatus for washing and disinfecting the interiors of trailers and vans having a boom structure having a washing head and disinfecting nozzle connected to the free end of the boom. The boom is connected to a fixed mounting structure having means for both raising and lowering the boom in the vertical direction as well as at various angles with respect to the horizontal. The washing head is secured to an extension member telescoped within the boom structure. The extension member is biased away from the boom structure and serves to absorb impact if the trailer is not stopped in time as the interior thereof is backed onto the boom and the washing head engages the closed end thereof. The washing head is also rotated to direct the washing fluid toward the closed end of the trailer upon engagement therewith and back toward the open end of the trailer as the trailer is driven away from the boom to thereby flush out debris.

8 Claims, 8 Drawing Figures

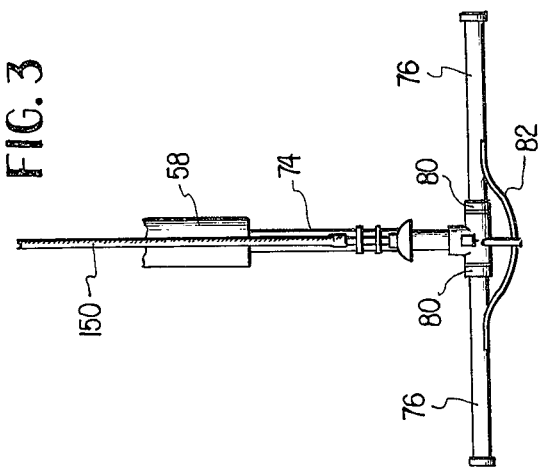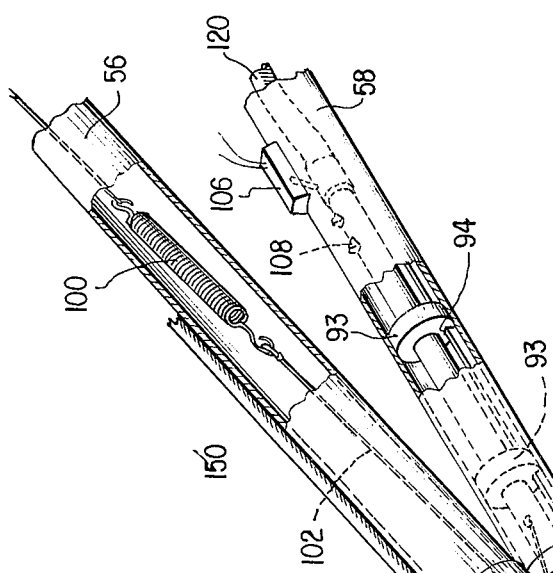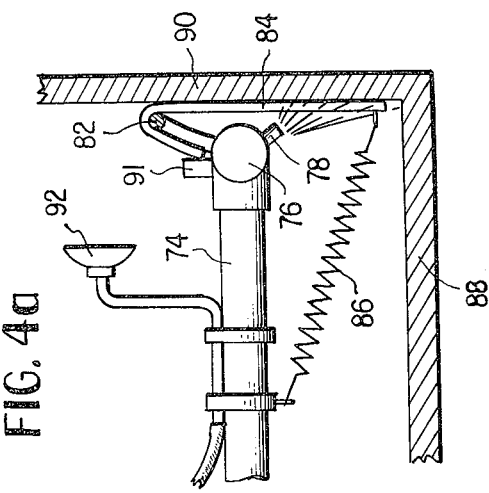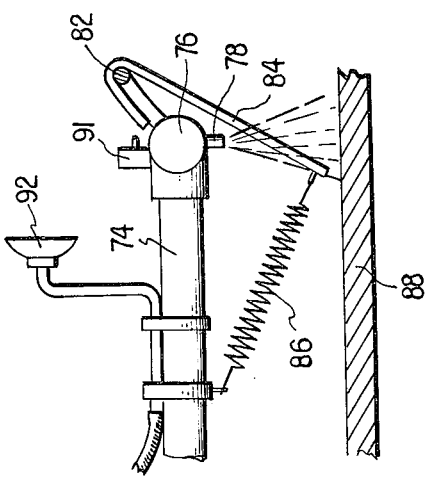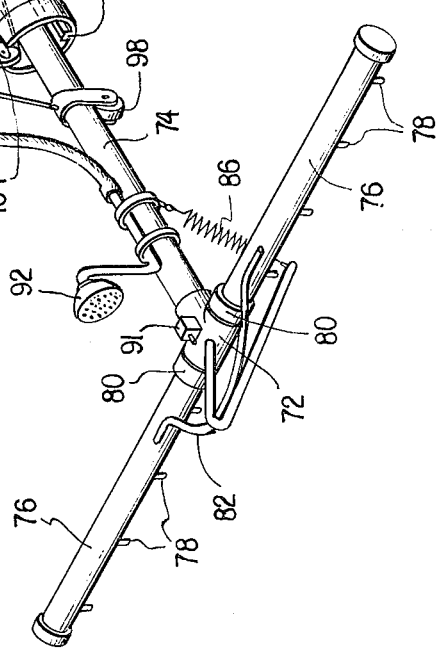

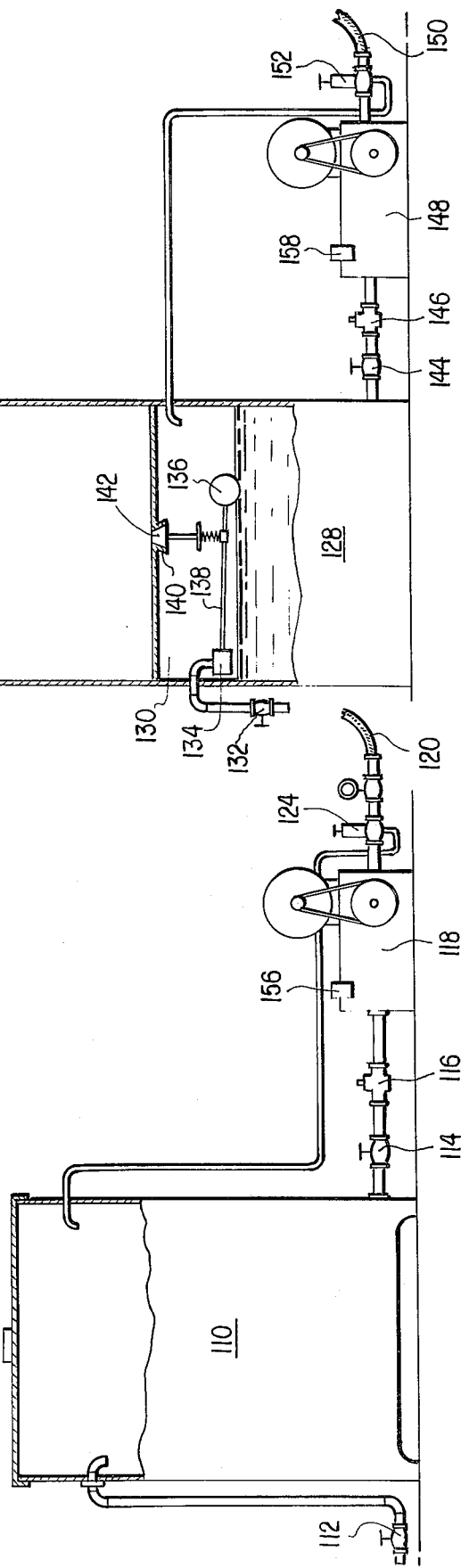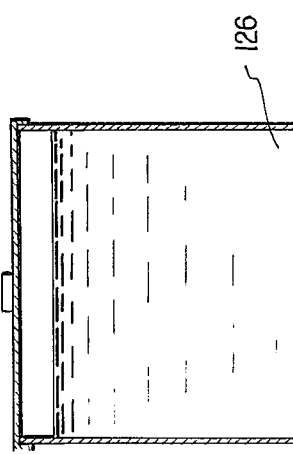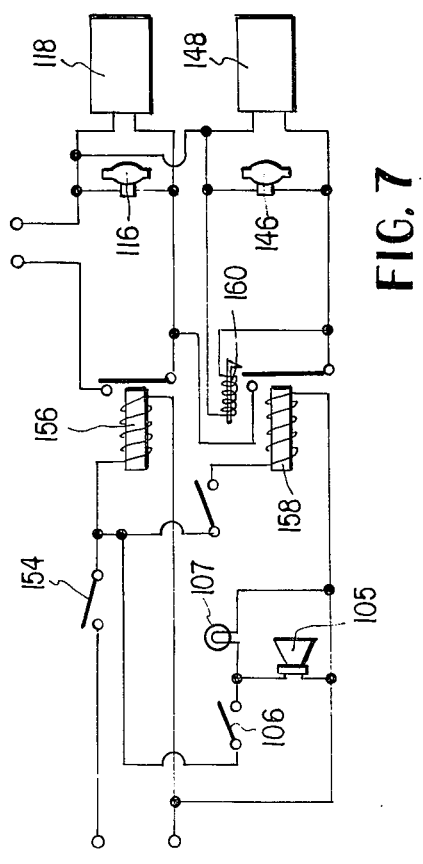

APPARATUS FOR WASHING AND DISINFECTING TRAILER OR VAN INTERIORS

BACKGROUND OF THE INVENTION

This invention relates to an apparatus for washing out and disinfecting the interiors of various types of trailers or vans which is adjustable to a plurality of heights and angles and which has a retractably and rotatable washer head which absorbs impacts as well as insures washing and flushing of debris from adjacent the closed end of the trailer. The term trailer or van as used herein is any type of road vehicle structure which is towed behind or integrally associated with the motive portion of the vehicle.

Various devices have been employed for washing out the interiors of trailers with a fluid sprayed from a plurality of nozzles. These devices of the prior art generally fall into two catagories: those which have the nozzles mounted on self-propelled units which traverse the interior of the trailer, such as that disclosed in U.S. Pat. No. 3,534,746 to Posner, and those which are stationary and require the trailer to be moved onto and away from a boom supporting the nozzles, such as that disclosed in U.S. Pat. No. 3,689,318 to Phillips. The aforementioned self-propelled type is expensive both to construct and to operate. Trained personnel are required to set up the device which is time consuming and are also required to continually supervise its operation. The aforementioned stationary type of the prior art devices has numerous drawbacks. One being that because the height of the horizontally extending boom is fixed, only trailers having a level floor of a certain height can be accommodated. Another serious drawback is that the washing head and nozzles associated therewith are also in a fixed position normally directed downward and back toward the boom which precludes effective washing and flushing of washed debris from the closed end of the trailer. In view of the aforementioned disadvantages of the prior art devices, a need for a new and improved apparatus exists for washing out trailer interiors.

SUMMARY OF THE INVENTION

A general object of the present invention is to provide an apparatus for washing trailers which overcomes the above disadvantages and limitations of the prior art devices in which trailers with varying height and depth interiors can be effectively and completely washed, disinfected and flushed by backing the trailer onto and away from the apparatus.

Another object of the invention is to provide an apparatus which has easily operable means for varying the height and angular position of the boom structure and washing head supported thereby.

Still another object of the present invention is to provide a washing head which is retractable and rotated upon engagement with the closed end of the trailer to prevent damage to the entire washing apparatus and insure complete washing and flushing of that portion of the trailer.

A further object of the present invention is to provide an apparatus for disinfecting the interiors of trailers as the trailer is being driven away from the apparatus.

The foregoing objects are achieved in the present invention by providing an elongated boom structure having one end slidably secured to a vertically disposed mounting structure anchored at ground level. The mounting structure has separate manually operable means for varying the height of the boom structure above ground level and at various angles with respect thereto in order to accommodate the interior of a trailer being backed onto the boom structure.

A washing head is rotatably secured to a spring biased extension member which is capable of telescoping into the boom structure when the washing head engages the closed end of the trailer to thereby prevent damage to the washing head, boom structure or mounting surface. The washing head has laterally extending members containing spray forming nozzles which direct washing fluid against the floor of the trailer and across substantially the entire width of the trailer. As the washing head engages the closed end of the trailer, the washing head is rotated to thereby direct the nozzle and therefore the spray toward the closed end and into the corner where the closed end meets the trailer floor. Rotation of the washer head also causes actuation of a switch to energize a second pump to deliver a sanitizing solution to a separate nozzle mounted adjacent the washing head. Retraction of the extension member a predetermined distance will also result in the actuation of a warning device to the truck driver to begin braking his rearward motion onto the boom structure. The washing and chemical disinfecting fluids are supplied under pressure from separate tanks to the washing head and disinfecting nozzle, respectively.

BRIEF DESCRIPTION OF THE DRAWINGS

FIG. 2 is a partial perspective view with portions cut away of the end portion of the boom structure.

FIG. 3 is a plan view of the washing head of the present invention.

FIG. 4 is a side view of the washing head in its normal operating position.

FIG. 4a is a side view of the washing head in its rotated position.

FIG. 5 is a side elevational view of the holding tank and high pressure pump for supplying wash water to the washing head.

FIG. 6 is a side elevational view of the holding tank and high pressure pump for supplying the disinfecting fluid to the spray nozzle.

FIG. 7 is a wiring diagram in schematic form of the washing apparatus.

DETAILED DESCRIPTION OF THE PREFERRED EMBODIMENTS

Figure 1:
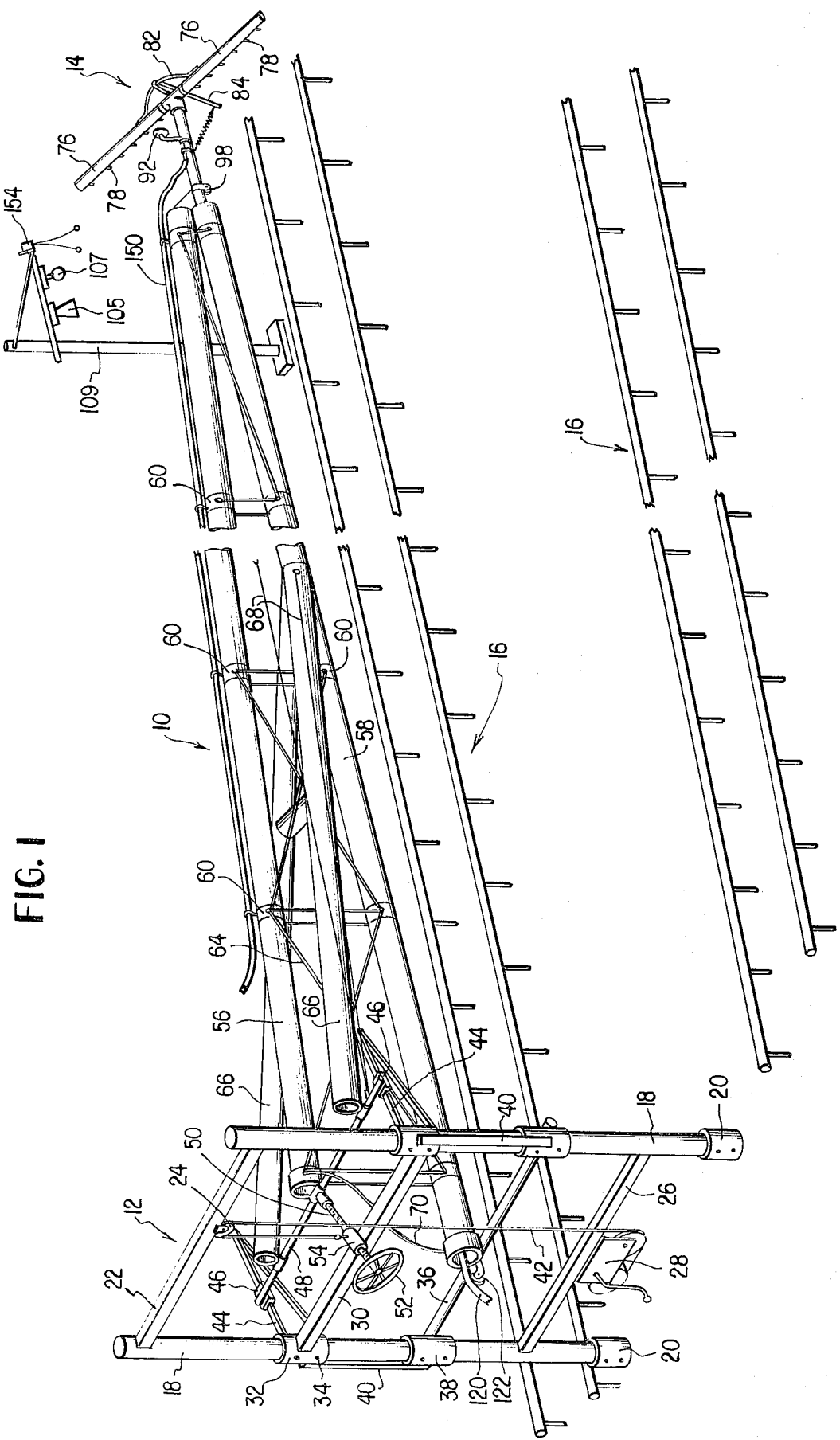
FIG. 1 is a perspective view of the mounting structure, boom and washing head of the trailer washing apparatus of the present invention.

Referring generally to FIG. 1, the apparatus for washing trailer interiors is shown constructed in accordance with the present invention. The apparatus includes an elongated boom structure 10 which is supported at one end on a mounting structure 12 secured in a vertical upright position. The other end of the boom structure 10 is free and has a washing head 14 mounted thereon. Parallel sets of spaced-apart rails 16 are located beneath the boom structure 10 for guiding the back wheels of the trailer (not shown) and thus the interior of the trailer onto the boom structure 10.

More particularly, the mounting structure 12 consists of two parallel, spaced-apart posts 18 positioned in sleeves 20 which are embedded in the earth, concrete or the like. An upper connecting member 22 is secured at its ends to the posts 18 and has a pulley 24 depending from approximately the mid-point of member 22. A lower connecting member 26 is also secured at its ends to the posts 18 and has mounted thereon a winch 28. A first cross-member 30 has a sleeve 32 secured transverse to each end thereof. The sleeves 32 are slidably positioned on the posts 18 and have set screws 34 for holding the cross-member 30 in position on the posts. A second cross-member 36, similar to cross-member 30 also has sleeves 38 secured transverse to each end thereof and is slidably positioned on the posts 18 below the cross-member 30. The sleeves 38 also have set screws 34 for holding the cross-member 36 in position. A connecting member 40 is secured to each set of sleeves 32, 38 on each post 18 to maintain the sleeves and cross-members 30, 36 in spaced-apart relationship to each other. A winch cable 42 extends from the winch 28 through the pulley 24 and is secured to the first cross-member 30 to thereby move the cross-members 30, 36 relative to the posts 18.

Parallel, spaced-apart, triangular shaped braces 44 are secured to sleeves 32 and each have a slidable bar 46 positioned thereon. A connecting rod 48 is secured at its ends to each of the bars 46 and has a threaded shaft 50 pivotably secured at the approximate midpoint to the rod 48. A turn wheel 52 is secured to the other end of the shaft 50. A threaded collar 54 is positioned on the shaft and secured to the first cross-member 30, such that as the wheel 52 is rotated, the rod 48 is caused to be moved toward or away from the cross-member 30.

The boom structure 10 consists of an upper, elongated hollow member 56 and is secured at one end to the rod 48 and at its other end to one end of a lower, elongated hollow member 58. The lower member 58 is in turn secured at its other end to cross-member 36. A plurality of spaced-apart bands 60 are placed on the hollow member 56 in vertical alignment with identical bands on hollow member 58. Connecting braces 62 extend between vertically aligned bands 60 to maintain the hollow members 56, 58 in spaced-apart relationship to each other. Additional connecting braces 64 extend between the bands 60 on the hollow member 56 to bands adjacent the vertically aligned bands on the hollow member 58 in order to insure maximum rigidity of the structure. Elongated hollow side support members 66 are also secured at one end to the outer portions of rod 48 and at the other end to lower hollow member 58. Guy-wires 68 extend from the ends of the rod 48 to the point where the side support members 66 are secured to the lower hollow member 58 and to the point where the upper and lower hollow members 56, 58 are joined. The support members 66 and guy-wires 68 serve to prevent the boom structure 10 from moving in the horizontal direction with respect to the posts 18. An S-shaped brace 70 is connected to the end bands 60 between the upper and lower hollow members 56, 58, respectively, as an added means to keep the ends apart a fixed amount as the boom 10 is positioned at various angles with respect to the horizontal.

Referring to FIGS. 2 – 4a, the washing head 14 consists of a T-connection 72 having an elongated section of feeder pipe 74 connected to the stem portion thereof. Sprayer heads 76 having spaced-apart spray nozzles 78 are rotatably connected to the arm portions of the connection 72 by means of a hydraulic coupling shown generally at 80. Such couplings 80 permit the heads 76 to rotate relative to the connection 72 without loss of fluid. An example of such a coupling is made by Hydraulics, Inc., of Ft. Worth, Texas. The spray nozzles 78 are aligned on each sprayer head 76 and the nozzles 78 of one sprayer head are maintained in alignment with those of the other sprayer head by means of connecting bar 82. A curved bumper arm 84 is connected at one of its ends at the mid-point of the connecting bar 82 and at its other end to a spring 86 which in turn is secured to the feeder pipe 74. The spring 86 maintains the sprayer head nozzles 78 pointed in a downward position and slightly backward toward the ends of elongated members 56, 58 as can be seen in FIG. 4. Thus, as the trailer to be cleaned is backed onto and off of the boom 10, the direction of spray emanating from the nozzles forces dirt and debris from the floor 88 toward and out the open end of the trailer. As the bumper arm 84 engages the closed end 90 of the trailer, the sprayer head 76 is rotated to a position as shown in FIG. 4a to thereby direct the spray from the nozzles 78 into the corner where the floor 88 joins the closed end 90. As the trailer is moved off of the boom 10, the nozzles 78 are slowly rotated by means of the spring 86 to thereby force dirt and debris out of the corner and toward the open end of the trailer.

A switch 91 is mounted on the T-connection 72 and is actuated to its closed position by connecting bar 82 when the bumper arm 84 is in the position shown in FIG. 4a. Actuation of the switch 91 energizes a pump which delivers a sanitizing solution to a spray head 92 mounted on the feeder pipe 74. The pump and source of sanitizing solution will be more fully described later. As the trailer is moved off of the boom 10, the spray head 92 directs the sanitizing solution against the back 90 of the trailer as well as the floor 88 and other side walls (not shown).

In order to prevent damage to the washing head 14 on the boom 10 and mounting structure 14 in the event the driver does not stop the backward movement of the trailer upon the closed end 90 thereof engaging the bumper arm 84, the feeder pipe 74 is slidably mounted in the lower hollow member 58. Several spaced-apart discs 93 are positioned on the feeder pipe 74 coaxial therewith and each disc 93 has a substantially rectangular-shaped notch 94 in alignment with each other. The notches 94 ride on a rectangular-shaped bar 96 secured to the bottom of the lower hollow member 58 and serve to maintain the sprayer heads 76 in a position substantially parallel to the ground. A pulley 98 is located on the feeder pipe 74 a distance from the end of the lower hollow member 58 and is secured to the upper hollow member 56. The pulley 98 serves to maintain the feeder pipe 74 substantially in the center of the lower hollow member 58 throughout its movement. A spring 100 secured at one end is located in the upper hollow member 56, the other end being secured to the feeder pipe 74 by means of a cable 102 which extends over the pulley 104 rotatably mounted at the point where the upper and lower hollow members 56, 58 meet. The spring 100 serves to maintain the washer head 14 in its fully extended position and to return it to its extended position from its retracted position. A switch 106 is mounted on the lower hollow member 58 and has its actuating arm extending into the hollow portion directly in the path of a projection 108 on the feeder pipe 74. The switch 106 is actuated to its closed position to complete an electrical circuit to an alarm 105 and warning light 107 to indicate that the washer head 14 is in its fully retracted position and that any further movement thereof may cause damage to the entire washing apparatus. The alarm 105 and warning light 107 are mounted on a pole 109 positioned adjacent the guide rails 16 and accessible to the truck driver. The operation of the alarm circuit will be more fully described later in conjunction with description of the entire operation of the washing and sanitizing apparatus.

Referring now to FIG. 5, a tank 110 serves as a reservoir for washing water which may or may not contain a cleaning agent. Water from a source is piped into the tank 110 via a manual valve 112 and withdrawn therefrom via manual valve 114 and electrically actuated solenoid valve 116 by means of an electric pump 118. The washing water is pumped at high pressure to the washing head 14 by way of a flexible hose 120 which extends over a pulley 122 into the lower hollow member 58 and to the feeder pipe 74. The pressure of the water emanating from the washer head 14 can be controlled by a pressure relief valve 124 which is piped back to the tank 110.

FIG. 6 shows a tank 126 divided into an upper compartment 128 and lower compartment 130. The upper compartment 128 serves as a storage area for concentrated sanitizing solution which must be mixed with water before use. The lower compartment 130 serves as a storage area for regular water which is introduced thereto via manual valve 132 and a valve 134 actuated by means of a float 136 and connecting arm 138. A valve seat 140 is provided in the bottom of the upper compartment 128 to permit sanitizing solution to enter and be mixed with the regular water in the lower compartment 130. A valve head 142 is attached to the connecting arm 138 and engages the valve seat 140 to prevent sanitizing solution from entering the lower compartment 130 when the float 136 is raised to a sufficient height to close valve 134.

The sanitizing mixture is withdrawn from the lower compartment 130 via manual valve 144 and electrically actuated solenoid valve 146 by means of an electric pump 148. The sanitizing solution is pumped at high pressure to the sanitizing spray head 92 by way of a flexible hose 150 which extends along the outer surface of upper hollow member 56. The pressure of the water emanating from the sanitizing spray head 92 can be controlled by a pressure relief valve 152 which is piped back to the lower compartment 130.

OPERATION

The trailer to be washed and sanitized is backed to a position such that the rear wheels are in alignment with the guide rails 16. Winch 28 is then rotated to position the boom structure 10 and washer head 14 at the desired vertical elevation such that the spray nozzles 78 are at an effective washing height above the floor 88 of the trailer. If the trailer floor 88 is at an angle with respect to the horizontal, as many trailers of tractor-trailer combinations are, turn wheel 52 is then rotated to position the boom structure 10 at a similar angle so that the washer head 14 and spray nozzles 78 will be maintained at a constant height relative to the floor 88 as the trailer is backed onto the boom. A switch 154 mounted on pole 109 is then actuated by the truck driver. As can be seen by referring to FIG. 7, the closure of switch 154 energizes starter relay 156 which in turn completes the electrical circuit to solenoid actuated valve 116 and pump 118 to thereby deliver water under pressure to the washing head 14. The trailer is then backed onto the boom structure 10 and the spray from nozzles 78 loosens all dirt, etc., from the floor of the trailer.

As the closed end 90 of the trailer engages bumper arm 84, the spray from nozzles 78 washes out the corner where the closed end 90 meets the floor 88. At this time, the bumper arm also closes switch 91 which in turn energizes starter relay 158. Energization of starter relay 158 completes a circuit to solenoid valve 146 and pump 148 which in turn delivers sanitizing solution under pressure to spray head 92. Energization of starter relay 158 also energizes latching mechanism 160 which holds the contacts of relay 158 in their closed position as the trailer is withdrawn and switch 91 opens.

If the trailer continues to be backed onto the boom structure 10, the feeder pipe 74 is retracted into the lower hollow member 58 until projection 108 trips switch 106. Closure of switch 106 energizes an alarm 105 such as a horn and a red light 107 to thereby warn the truck driver to immediately apply his brakes and begin driving the trailer off of the boom structure 10. As the trailer is driven off of the boom structure 10, the interior wall, roof and floor are sprayed with sanitizing solution and all dirt and debris are pushed downward and out the open end of the trailer by means of the spray from nozzles 78 which have returned by means of spring 86 to their original position. The driver then actuates switch 154 which in turn deenergizes relay 156, latching mechanism 160, solenoids 116, 148 and pumps 118, 148. The entire apparatus is then ready to repeat the washing process on another trailer.

Having illustrated and described embodiments of this invention in some detail, it will be understood that these descriptions and illustrations have been offered by way of example, and that the invention is to be limited in scope only by the appended claims.

What we claim is:

1. An apparatus for washing and disinfecting the interiors of trailers and vans having an open and closed end, said apparatus comprising:
   a. a vertically extending mounting structure fixed at one end;
   b. a boom structure secured at one end to said mounting structure and extending in a substantially horizontal position;
   c. means secured to said mounting structure for moving said boom structure to a plurality of vertical elevations to accommodate interiors of varying heights;
   d. means secured to said mounting structure for positioning said boom structure at a plurality of angles with respect to the horizontal;
   e. outwardly biased extension means slidably positioned in the free end of said boom structure means for biasing said extension means outwardly;
   f. a source of washing fluid under pressure; and
   g. a washing head rotatably attached to said extension means and connected to said source of washing fluid, said washing head having spray forming means biased to direct said washing fluid generally downward and back toward said free end of said boom structure when said trailer is being freely backed onto and away from said boom structure and directed generally downward and away from said free end of said boom structure when said washing head is in engagement with said closed end of said trailer said outwardly biasing means of said extension means actint to return said extension means to its original position with respect to the boom structure after said rotatable washing head has disengaged the closed end of said trailer.

2. An apparatus for washing and disinfecting the interiors of trailers and vans having an open and closed end, said apparatus comprising:
   a. a vertically extending mounting structure fixed at one end and having two spaced-apart posts with first and second spaced-apart, horizontally disposed cross-members slidably positioned on said posts;
   b. a boom structure secured at one end to said mounting structure and extending in a substantially horizontal position, said boom structure having upper and lower hollow, elongated tubular boom members, one end of each of said boom members being connected together and the other end of said upper boom member being connected to said first cross-member and said other end of said lower boom member being connected to said second cross-member;
   c. means secured to said mounting structure for moving said boom structure to a plurality of vertical elevations to accommodate interiors of varying heights;
   d. means secured to said mounting structure for positioning and boom structure at a plurality of angles with respect to the horizontal;
   e. extension means slidably positioned in the free end of said boom structure;
   f. a source of washing fluid under pressure; and
   g. a washing head rotatably attached to said extension means and connected to said source of washing fluid, said washing head having spray forming means biased to direct said washing fluid generally downward and back toward said free end of said boom structure when said trailer is being freely backed onto and away from said boom structure and directed generally downward and away from said free end of said boom structure when said washing head is in engagement with said closed end of said trailer.

3. An apparatus as set forth in claim 2 wherein said first cross-member is connected by cable to a winch means for raising and lowering said first and second cross-members and said boom structure.

4. An apparatus as set forth in claim 2 wherein said first cross-member has horizontally extending, spaced-apart brace means secured thereto, a cross-bar positioned between said brace means and slidable thereon, said upper end of said tubular member being connected to said cross-bar, and means connected between said cross-bar and said first cross-member for moving said cross-bar relative to said cross-member to thereby position said boom structure at various angles with respect to the horizontal.

5. An apparatus as set forth in claim 4 wherein additional hollow tubular members are connected between said cross-bar and said lower tubular boom member to prevent said boom structure from moving in the horizontal direction.

6. An apparatus as set forth in claim 2 wherein said extension member is slidably positioned in said lower boom member and is biased to its fully extended position by means of a spring located in said upper boom member and connected to said extension member.

7. An apparatus as set forth in claim 1 wherein said washing head comprises oppositely disposed header pipes laterally extending transversely of said extension member, each of said header pipes having a plurality of said spray forming means equally spaced apart, and feeler means operatively connected to said header pipes for rotating said pipes upon engagement of said feeler with said closed end of said trailer.

8. An apparatus as set forth in claim 1 further comprising nozzle means secured to said extension member and connected to a source of disinfecting fluid under pressure for spraying said interior of said trailer as said trailer is moved away from said boom structure.

* * * * *